United States Patent

[11] 3,600,949

| [72] | Inventors | Hermann R. K. N. Janeschitz-Kriegel Delft; Johannes Schijf, The Hague, both of, Netherlands |
|---|---|---|
| [21] | Appl. No. | 837,167 |
| [22] | Filed | June 27, 1969 |
| [45] | Patented | Aug. 24, 1971 |
| [73] | Assignee | Nederlandse Organisatie Voor Toegepast-Natuurweten Schappelijk Onderzoek Ten Behoeve Van Nijverheid, Handel En Verkeer |
| [32] | Priority | July 1, 1968 |
| [33] | | Netherlands |
| [31] | | 6809280 |

[54] PRESSURE GAUGE
2 Claims, 1 Drawing Fig.

[52] U.S. Cl. ............................................. 73/395, 73/406, 338/4
[51] Int. Cl. ................................................. G01l 7/00
[50] Field of Search ....................... 73/395, 398 R, 393, 406; 338/4, 36

[56] References Cited
UNITED STATES PATENTS

| 2,636,964 | 4/1953 | Lancor, Jr. et al. | 73/398 X |
| 2,721,919 | 10/1955 | Li et al. | 338/4 |
| 2,951,223 | 8/1960 | Li | 338/4 |
| 3,286,213 | 11/1966 | Li et al. | 338/36 X |
| 3,376,749 | 4/1968 | Kriegl et al. | 73/406 |

Primary Examiner—Louis R. Prince
Assistant Examiner—Daniel M. Yasich
Attorney—Hammond & Littell ABSTRACT: In a pressure gauge for extruders a pressure sensitive and a pressure-insensitive place of the pressure feeler are connected to the input member and to the body of a displacement meter by two identical sets of rods, to make the pressure gauge insensitive to temperature changes.

PATENTED AUG 24 1971 3,600,949
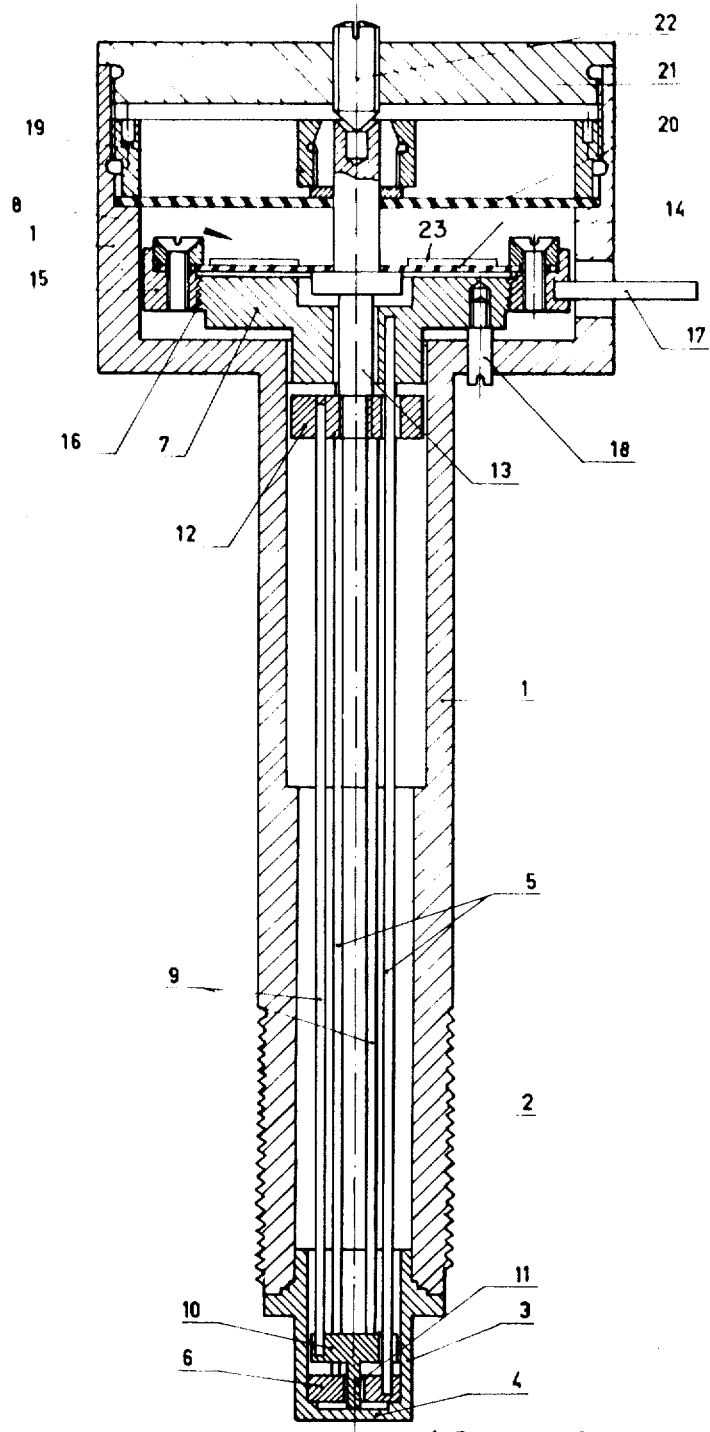
INVENTORS
HERMANN R. K. N. JANESCHITZ-KRIEGL
BY JOHANNES SCHIJF
ATTORNEYS

PRESSURE GAUGE

The invention relates to a pressure gauge, in particular for measurements during the extrusion and injection moulding of thermoplastic synthetic resins and the like materials, comprising an oblong case, on the one end of the case a pressure feeler, elastically deformable under the influence of the pressure to be measured, at the other end of the case a displacement meter having a movable input member and a connecting means for transmission of the deformations of the pressure feeler to the displacement meter.

The pressure gauges known in the art, in which a hollow cylinder with a bottom constitutes the pressure feeler and in which a pressure pin, resting against the center of this bottom, transmits the deflection of the latter to the displacement meter, are highly sensitive to variations in temperature.

During extrusion and injection moulding, temperature fluctuations are substantially unavoidable, because in the usual extruders and injection moulders the external heating and cooling are constantly switched off and on by an automatic temperature control device.

The temperature fluctuations are neither followed simultaneously nor with the same amplitude by the case and the pressure pin of the pressure gauge so that there is an ever-changing difference in temperature between those two parts. The relative changes in length of the pressure pin with respect to the case resulting therefrom cause indications of the displacement meter that are by no means related to the pressure to be measured.

The errors introduced in this manner are far from negligible. On the one hand, this is due to the fact that the case of the pressure gauge and therefore also the pressure pin must be fairly long in view of the heating and cooling mantles, which are arranged around the extrusion or injection moulding press and in view of the press temperature, which may be 100° up to 400° C. and which should not penetrate as for as the displacement meter. On the other hand the deformations of the cylinder bottom, which are a measure for the pressure to be gauged, are very slight; they usually amount to only a few hundredths of a millimeter. The relative changes in length of the pressure pin, caused by the temperature fluctuations are of the same order of magnitude, so that with the pressure gauges known in the art, measuring errors of 50 percent are no exception.

It is the object of the invention to provide a pressure gauge, the indication of which is not or only to a negligible extent affected by fluctuations in temperature.

For this purpose the pressure gauge according to the invention is characterized by such a mounting of the displacement meter to the case that movements are allowed lengthwise in the case, and by two connecting elements substantially identical and substantially identically arranged in the case, which form mutually independent connections of the displacement meter and its input device on the one hand, with a part of the pressure feeler that is liable to deformations and a part of the pressure feeler or the case rear the pressure feeler that is not or to a lesser extent liable to deformations, on the other hand.

With a pressure gauge arranged in this way a thermal change in length of the one connecting element results in a shift in position of the displacement meter with respect to the case and a thermal change of the other connecting element in a shift of the input member of the displacement meter.

As both connecting element, however, due to their mutual identity, can only be liable to substantially equal and simultaneous thermal changes in length, changes in temperature do not affect the position of the input member of the displacement meter with respect to the displacement meter itself and consequently do not affect the indication of the meter either. The measuring results of this meter are exclusively determined by the deformations of the pressure feeler, which cause unequal shifts in position of both connecting elements and thus a relative displacement of the input member of the displacement meter.

The invention will be further elucidated below with reference to the drawing, which shows a cross section of a preferential embodiment of the pressure gauge according to the invention.

At its one end, where with screw thread 2 for mounting it into the wall of for example an extrusion press or an injection moulding press is provided, cylindrical case 1 of the pressure gauge is closed by the hollow measuring cylinder 3. Bottom 4 of measuring cylinder 3 is a membrane, which can deflect under the influence of the pressure to be measured.

Three parallel rods 5, two of which are shown in the drawing, with their one end are mounted in disc 6, which rests on the circumference of membrane 4. With their other end rods 5 are mounted in support 7 of the displacement meter indicated by 8.

A second number of three rods 9, two of which are also shown in the drawing, is, closely over disc 6, interconnected by disc 10, which rests with pin 11 via a bore in disc 6 on the center of membrane 4, and which on its periphery has recesses for rods 5.

At their other end rods 9 are connected by disc 12, in which bores are provided for rods 5. Members 6 and 7 interconnecting rods 5 and members 10 and 12 interconnecting rods 9 are considered to be yokes.

Rods 5 and 9 are hexagonally arranged around the center line of case 1 and in such a way that each of rods 5 in between two rods 9 and vice versa.

Disc 12 is attached to input member 13 of displacement meter 8 by means of screwheads. This meter 8 is formed by the thin sheet 14 provided with strain gauges, which with its circumference is clamped in ring 15 and rests in the center of input member 13. Ring 15 is connected to support 7 via screw thread 16 and can be turned with respect to support 7 with the aid of pin 17. In view of this, support 7 is safeguarded by screw 18 against rotating along.

In order to center input member 13, membrane 20 is attached to it by means of swivel 19. This membrane 20 is clamped with its circumference in case 1.

Case 1 is closed at the top by lid 21. In the center of the latter, screw 22, which can be tightened against input member 13, is provided.

The pressure gauge operates as follows:

The pressure gauge is fixed by means of screw thread 2 in an opening in the wall of for example an extruder.

During extrusion the extrusion material in the extruder exercises a pressure on membrane 4, which by this deflects to an extent dependent on the pressure. As a result of this deflection the center of sheet 14 is pressed upwards by the center of membrane 4, where the deflection is maximum, via pin 11, disc 10, rods 9, disc 12 and input member 13.

Because support 7 rests, via rods 5 and disc 6, on the edge of membrane 4, the latter in not pressed upwards, or as a result of the compression of measuring cylinder 3, to a slight and negligible extent. Thus the center of sheet 14 is pressed upwards with respect to its circumference, so that stresses arise in sheet 14, which cause a change in the electric resistance of the strain gauges 23 present on sheet 14. By measuring this change in resistance with the equipment usually employed for this purpose, the pressure affecting membrane 4, can be determined.

When in the environments of the pressure gauge a change in temperature occurs, for example by switching on the air-cooling of the extruder, the temperature of case 1 begins to change, too.

Rods 9, which transmit the deflection of membrane 4 to sheet 14, follow these changes in temperature with a delay, the magnitude of which depends on the thermal resistance between case 1 and rods 9 and the heat capacity of rods 9.

Through the change in temperature rode 9 undergo a change in length and as a result of this the center of sheet 14 undergoes a change in position which by no means is related to the pressure on membrane 4.

Rods 5, which are under the same thermal conditions as rods 9 and consequently undergo the same change in length, simultaneously, however, give an equally large displacement to support 7, and along with this to the edge of sheet 14, so that the deflection of sheet 14 is not affected by the changes in length of rods 5 and 9 and no measuring errors arise through the change in temperature.

By turning ring 15 with the aid of pin 17 the position of the circumference of sheet 14 with respect to its center part can be changed in axial direction to adjust the zero point of the pressure gauge.

With the aid of screw 22, which during the measurements is turned outwards to such an extent that it cannot come into contact with input member 13, the input member can be pressed downwards to relieve sheet 14 and thus offer the possibility to correct for example a change, if any, of the zero-point of the electric equipment during the operation of the extruder.

We claim:

1. A pressure gauge for extruders comprising an oblong case having disposed in one end a pressure feeler elastically deformable by the pressure to be measured and disposed in the opposite end of the case a displacement meter mounted longitudinally movably and having a fixed part and a moveable input member and means connecting the said feeler and said meter for transmitting the deformation of the said feeler to said meter, said connecting means comprising two separate sets of substantially identical connecting elements arranged substantially identically in the case, one of said sets connecting a deformation sensitive part of said pressure feeler with said moveable member and the other set connecting a deformation insensitive part of said pressure feeler with said fixed part of said displacement meter.

2. Pressure gauge according to claim 1 wherein each of the connecting elements comprises at least two pins on both ends connected by a yoke, and wherein the pins of the one connecting element and the pins of the other connecting element are reciprocally arranged in the same way with respect to each other.